United States Patent [19]
Mason et al.

[11] Patent Number: 5,327,741
[45] Date of Patent: Jul. 12, 1994

[54] REFRIGERANT RECOVERY AND PURIFICATION MACHINE

[75] Inventors: James L. Mason, Niles; Martin H. Pingel, Galien, both of Mich.

[73] Assignee: Envirotech Systems, Niles, Mich.

[21] Appl. No.: 820,543

[22] Filed: Jan. 14, 1992

Related U.S. Application Data

[63] Continuation-in-part of Ser. No. 596,388, Oct. 12, 1990, abandoned.

[51] Int. Cl.$^5$ .............................................. F25B 45/00
[52] U.S. Cl. ...................................... 62/149; 62/195; 62/292; 62/475
[58] Field of Search .................. 62/77, 85, 149, 195, 62/292, 470, 475, 228.1

[56] References Cited

U.S. PATENT DOCUMENTS

| | | | |
|---|---|---|---|
| 3,357,197 | 12/1967 | Massengale | 62/475 |
| 4,364,236 | 12/1982 | Lower et al. | 62/77 |
| 4,768,347 | 9/1988 | Manz et al. | 62/149 |
| 4,805,416 | 2/1989 | Manz et al. | 62/292 |
| 4,862,699 | 9/1989 | Lounis | 62/292 |
| 5,005,369 | 4/1991 | Manz | 62/195 |
| 5,090,211 | 2/1991 | Peters | 62/292 |

Primary Examiner—John M. Sollecito
Attorney, Agent, or Firm—James D. Hall

[57] ABSTRACT

A refrigerant recovery machine which includes a distiller, oil separator, filters and an air separator to purify and reclaim refrigerant gas from a cooling system. The air separator may include a dual pressure gauge to regulate partial pressures of air and refrigerant to prevent the refrigerant from being vented to the atmosphere.

6 Claims, 4 Drawing Sheets

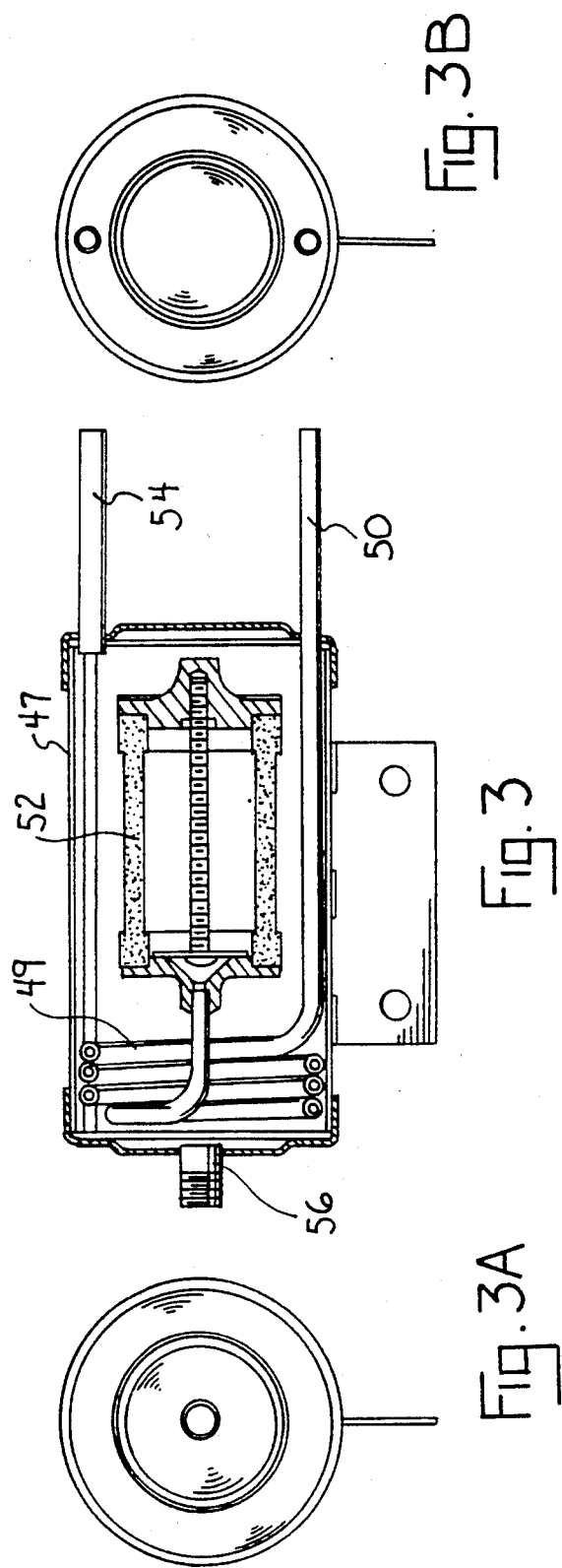
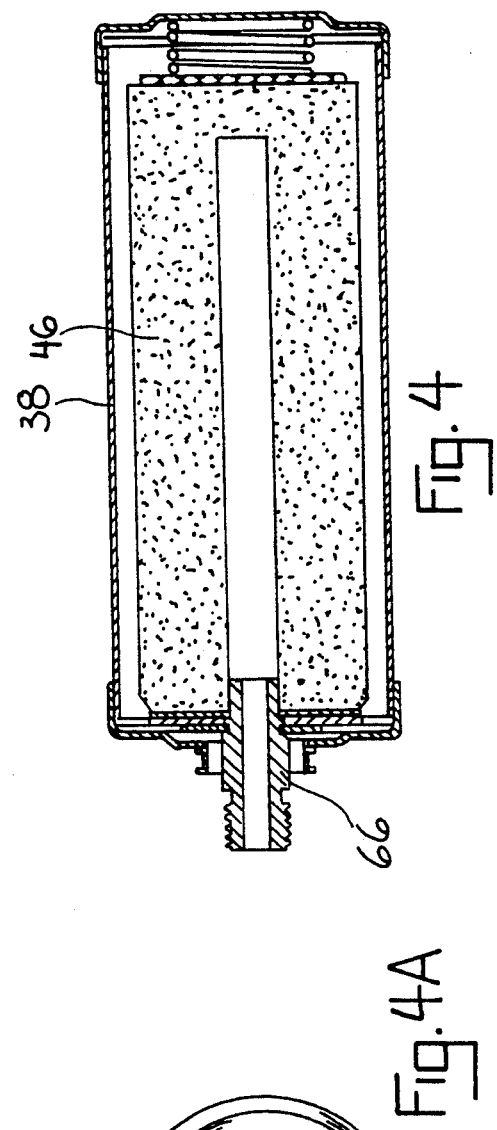

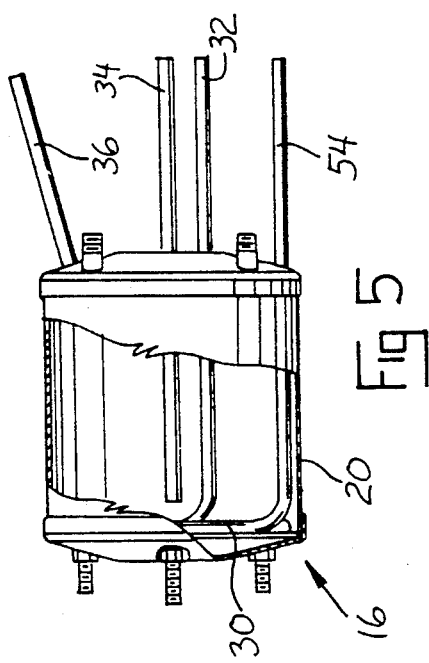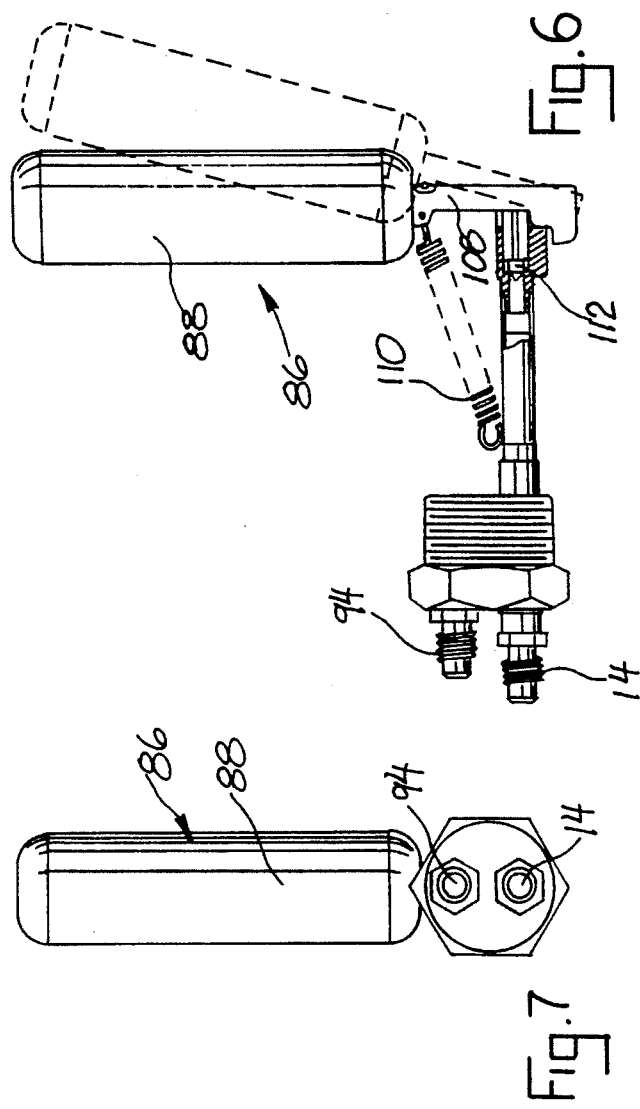

5,327,741

REFRIGERANT RECOVERY AND PURIFICATION MACHINE

CROSS-REFERENCE TO RELATED APPLICATIONS

This application is a continuation-in-part of co-pending application Ser. No. 596,388, filed Oct. 12, 1990 now abandoned.

FIELD OF THE INVENTION

This invention relates to refrigerant recovery machines and will have application to a machine for purifying and recovering refrigerant fluid from air conditioning systems.

BACKGROUND OF THE INVENTION

Flushing and recharging of air conditioners and refrigerators has always posed problems with the inevitable discharge of a portion of the refrigerant gas. With the discovery of the harmful affects of releasing halogenated fluorocarbons to the environment, strict regulations have been enacted, particularly with regard to Freon-12, which is the most widely used refrigerant in automobile air conditioners and other small units of that type.

Refrigerant recovery systems have been constructed which minimize the discharge of refrigerant gas. Two such systems are shown in U.S. Pat. Nos. 4,476,688, issued Oct. 16, 1984, and 4,539,817, issued Sep. 10, 1985. Both of these systems include a condenser and a series of filters designed to liquify the refrigerant and to separate solid liquid impurities therefrom. In both systems, indeed in all prior recovery systems, careful attention must be paid to the operating conditions of the system to insure maximum performance and to prevent overloading and possible refrigerant gas leakage. Since the process is a relatively lengthy one, the constant attention required hinders the profitability of a service organization by tying up the mechanics, or worse, can be dangerous when left unattended by the mechanic who often has several other jobs to perform in a limited time. Further, the prior art systems could not be periodically checked to insure the effectiveness of the recovery, and were deficient at removing ambient air, a naturally occurring refrigerant gas contaminant, and oil contamination due to interaction of refrigerant with oil from the compressor pump.

SUMMARY OF THE INVENTION

The refrigerant recovery machine of this invention obviates the deficiencies of the prior art systems, both those described above, and others commercially available in the market place. This machine includes the usual compressor, filters, and distiller to circulate, filter, and liquify refrigerant removed from an air conditioning unit or other refrigeration system.

The machine also includes an oil separator downstream of the condenser and an air separator to remove gaseous impurities from the refrigerant. A series of valves and other regulating devices insure automatic efficient operation of the machine and serve to adjust or shut the machine down if operating conditions become dangerous.

Accordingly, it is an object of this invention to provide a novel system for purifying and recovering refrigerant from a refrigeration unit.

Another object is to provide a refrigerant gas recovery system which maximizes gas recovery.

Another object is to provide a refrigerant gas recovery system which is largely self-regulating.

Still another object is to provide a refrigerant gas recovery system which allows for periodic testing of the purified refrigerant to ensure efficiency of operations.

Other objects will become apparent upon a reading of the following description.

BRIEF DESCRIPTION OF THE DRAWINGS

A preferred embodiment has been depicted for illustrative purposes only wherein:

FIG. 3 is a sectional view of the oil return of the machine.

FIG. 3A is a left end view as seen in FIG. 3.

FIG. 3B is a right end view as seen in FIG. 3.

FIG. 4 is a sectional view of a filter element as used in the machine.

FIG. 4A is a left end view as seen in FIG. 4.

FIG. 5 is a sectional view of the distiller used in the machine.

FIG. 6 is an enlarged view of the float used to regulate the collection tank.

FIG. 7 is a top plan view of the float.

DESCRIPTION OF THE PREFERRED EMBODIMENT

The preferred embodiment herein described is not intended to be exhaustive or to limit the invention to the precise form disclosed. It is chosen and described to explain the principles of the invention and its application and practical use to enable others skilled in the art to utilize its teachings.

Figure 1:
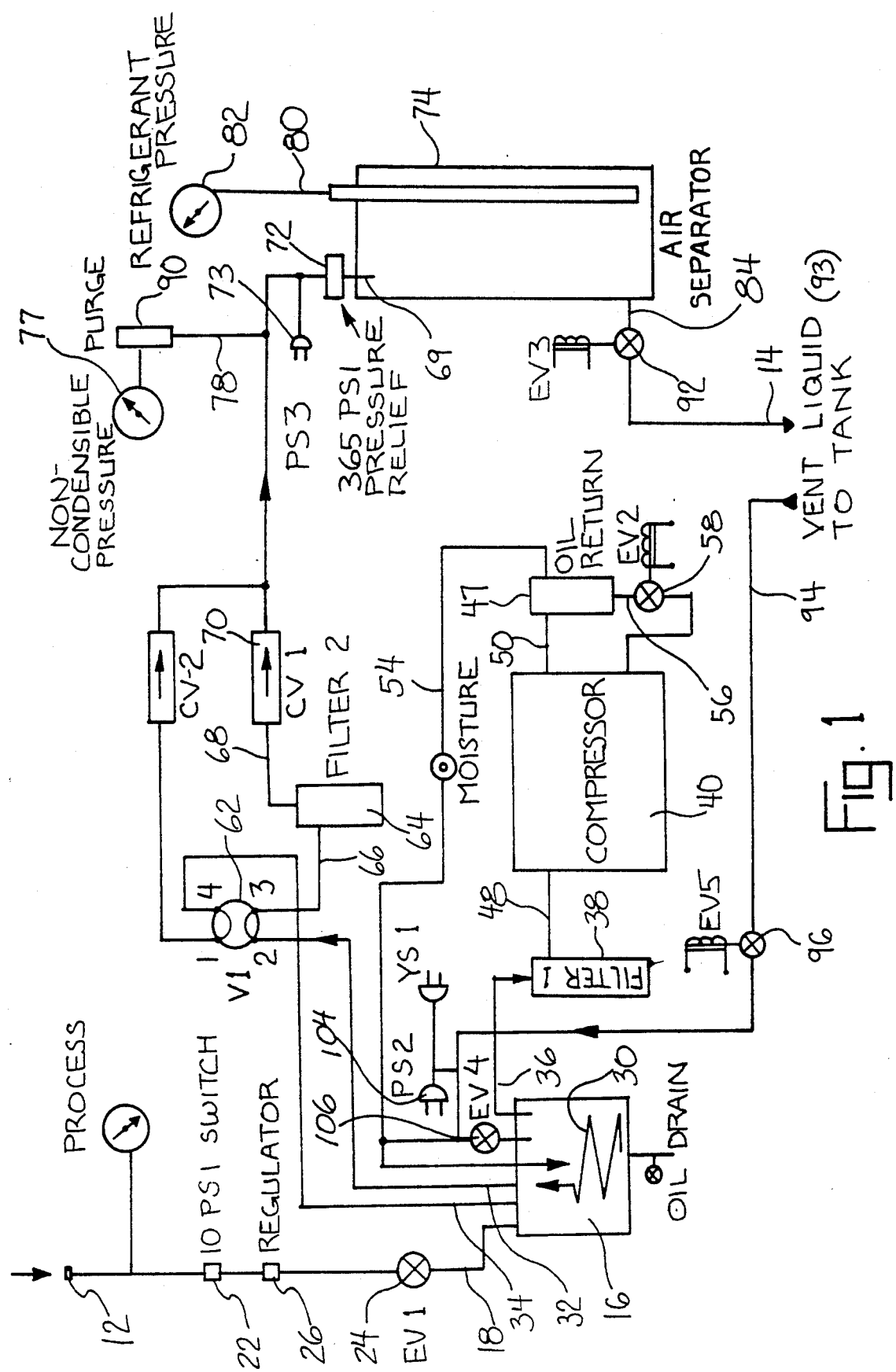
FIG. 1 is a schematical representation of the purification and recovery system of this invention.
Figure 2:
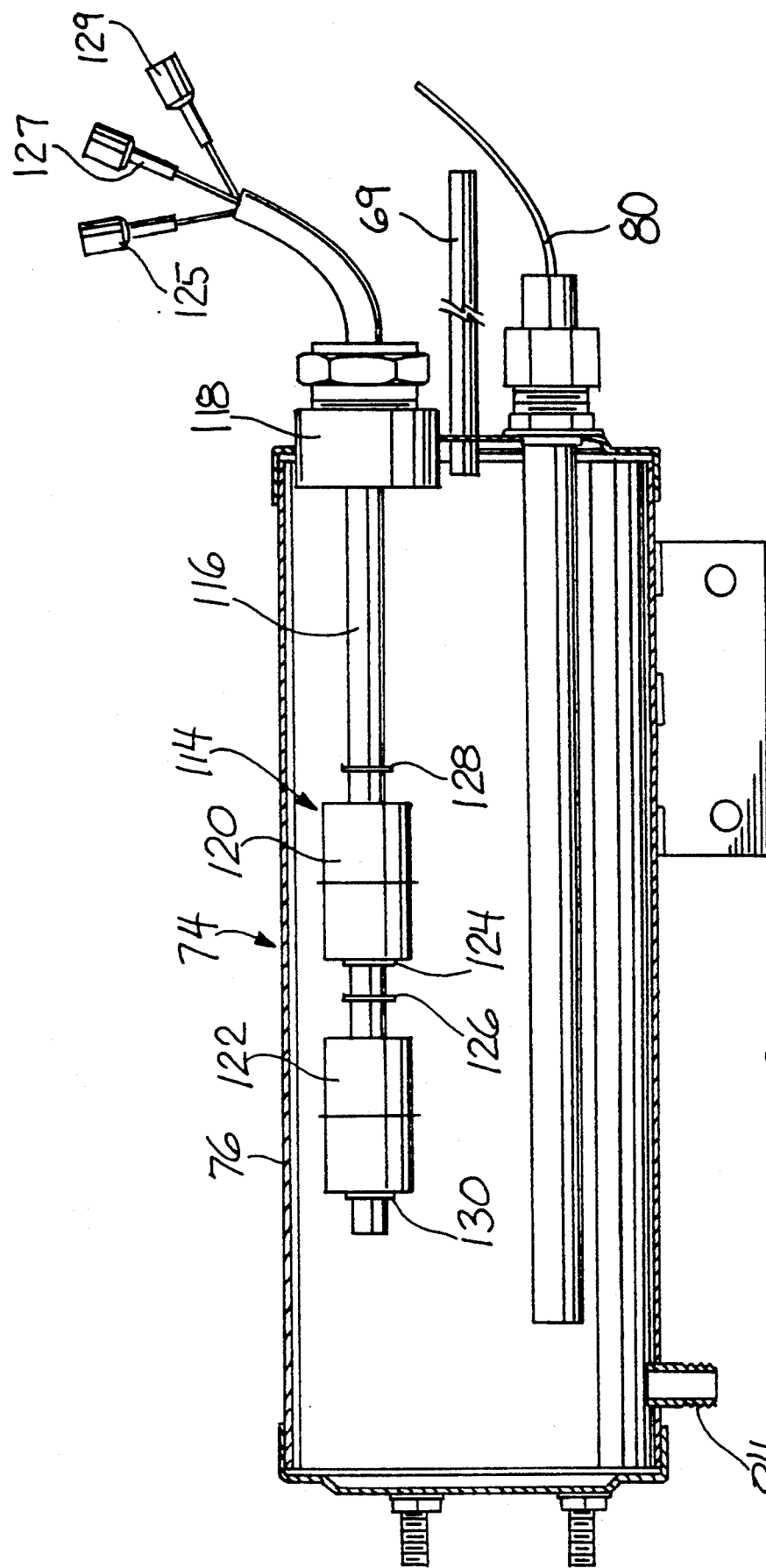
FIG. 2 is a sectional view of the air separator tank of the machine.

Referring first to FIG. 1, reference numeral 10 refers generally to the refrigerant gas purification and recovery machine that is the subject of this invention. Machine 10 is used in the purification and recovery of refrigerant gas from automobile air conditioning units, as well as other types of air conditioners which utilize halogenated fluorocarbons. The type of air conditioner to be serviced as well as the type of refrigerant recovered is not part of this invention, which will be adaptable to service many different types of refrigeration units and gases.

Machine 10 is connected to an outlet valve (not shown) of a refrigeration unit such as an automobile air conditioner (not shown) at inlet port 12. Machine 10 includes enclosed cyclic conduits described later which terminate in an outlet port 14 connected to a liquid collection tank 93 where the purified refrigerant is recovered and stored for recharging.

Inlet port 12 is connected in flow communication with a distiller 16 by conduit 18. Positioned along conduit 18 are pressure switch 22, electronic valve 24, and regulator 26. Pressure switch 22 and regulator 26 serve as a safety mechanism to close valve 24 and disable machine 10 if the intake pressure of refrigerant gas is less than a predetermined value. The preferred operating pressure of the machine is about 20 p.s.i. in the heat exchanger. If the pressure in the distiller 16 falls below a negative pressure in the distiller 16 falls below a negative pressure a timer (not shown) is activated which shuts off compressor 40 after a certain time to insure any residual refrigerant is removed from the system.

Distiller 16 as shown in FIG. 5 is a common industry item which includes housing 20, coils 30 and conduits 32, 34, 36. Refrigerant gas passes from distiller 16 via conduit 36 into filter 38 under the influence of compressor 40. As refrigerant is drawn through distiller 16, oil from the air conditioner which remains in liquid form is drawn off and held in the distiller to be drained.

As refrigerant passes through filter 38, solid impurities are removed via filter screen 46 (FIG. 4) which has also been impregnated with a desiccant material to remove any water which was not previously evaporated. From here, refrigerant gas passes through compressor 40 into an oil return 47 by conduits 48, 50. Oil return 46 shown in detail in FIG. 3 includes oil filter element 52 which separates the remaining oil from the refrigerant gas and also any oil which may have passed through with the gas from compressor 40. After oil separation, the refrigerant gas passes from the oil return 47 via conduit 54 to distiller coils 30. Oil return 47 is kept hot to prevent the refrigerant gas from liquefying by venting hot exhaust gas from compressor 40 into oil return 47. Oil which collects in oil return 47 is periodically drained out through conduit 56 with the oil flow controlled by electronic valve 58.

After the refrigerant gas passes through distiller coils 30 it is delivered under pressure through conduit 32 to a four way valve 62. In the normal operating mode shown in FIG. 1, valve 62 allows refrigerant gas to pass via conduit 66 through filter 64, which is of the same construction, however, filled with various media designed to accommodate a variety of refrigerants. Refrigerant gas then passes via conduit 68 through check valve 70, pressure relieve valve 72 and pressure switch 73 into air separator 74.

Air separator 74, shown in FIG. 5, operates on the principle that most refrigerant gases are heavier than air. Air separator 74 includes enclosed housing 76, inlet conduit 69, and vapor pressure conduit 80 which is connected to pressure gauge 82, and outlet conduit 84. Purge conduit 78 is connected in flow communication with conduit 69 and includes purge valve 90 and pressure gauge 77. Air separator 74 includes float switch control mechanism 114. Mechanism 114, as shown in FIG. 5, includes rod 116 suspended in air separator housing 76, and fixedly connected thereto by fastener 118. Floats 120, 122 are slidably positioned along rod 116 as shown and are separated by stop washers 124, 126. A pair of washers 128, 130 limit the sliding movement of floats 120, 122 respectively. Magnetic read switches are positioned under floats 120 and 122 and are connected via electrical cables 125, 127, 129 respectively to the main on-off switch (not shown) and to electronic valve 92.

Since the refrigerant gas entering air separator housing 76 is heavier than ambient air, the ambient air will rise to the top of the air separator housing where it is liberated to the atmosphere through manual purge valve 90, normally when air pressure exceeds refrigerant pressure by at least 20 p.s.i. Gauge 82 monitors refrigerant gas pressure through conduit 80.

As the machine 10 operates and refrigerant gas levels rise within air separator housing 76, the liquid level urges float 122 upwardly into washer 126. Upon float 122 contacting washer 126, an electronic signal is sent to valve 92 which opens to allow liquid refrigerant to drain into a collection tank (not shown). If the refrigerant liquid level in housing 76 rises to the point where float 120 contacts washer 128, an electronic signal is sent to the main on-off switch of the machine 10 to shut the machine off.

Purified liquid refrigerant is delivered via outlet conduits 84 and 14 into a sealed recovery tank (not shown). A return conduit 94 connects the recovery tank to distiller 16. Electronic valve 96 is connected to a timer (not shown) which opens periodically to deliver a quantity of refrigerant and non-condensable vapor back into machine 10 to be retreated to ensure maximum purification also to ensure low storage tank pressure for added safety. In the normal operating mode shown in FIG. 1, redelivered refrigerant passes via conduit 94 through valves 96 and 106 into machine 10. Pressure switch 104 permits the distiller to be charged to 20 p.s.i. at the end of the cycle to aid in the removal of trapped contaminants in the distiller.

FIGS. 7-8 illustrates float switch 86 used to prevent overloading the collection tank (not shown) which could result in a venting of refrigerant gas into the atmosphere. Float switch 86 is housed in collection tank (not shown) and includes buoyant float 88 pivotally connected to conduit 14 by swinging arm 108 and is suspended therefrom by spring 110. Conduit 14 as shown includes needle valve 112 which rests against float arm 108 and blocks the conduit to prevent further inflow of gas when the collection tank fills to a predetermined level (usually 80% of capacity). When the quantity of fluid in the collection tank falls below the predetermined level, the float 88 and valve 112 fall under the influence of gravity to open conduit 14 and allow refrigerant gas to enter the collection tank from the air separator.

After all of the refrigerant gas has been drained from the refrigeration unit and purified by machine 10 as above described and recovered in collection tank (not shown) the machine is switched off and the refrigerant gas recharged into the refrigeration unit in a conventional manner.

It is understood that the above description does not limit the invention to the given details, but may be modified within the scope of the following claims.

I claim:

1. A purification and recovery machine for refrigerants, said machine comprising an inlet means for connecting the machine to a source of refrigerant to be purified, means connected to said inlet means for vaporizing refrigerant to be purified, filter means connected to said means for vaporizing for removing solid and liquid impurities from the refrigerant to be purified, separator means connected to said filter means for removing oil from the refrigerant, an air separator tank connected in flow communication to said filter means, said air separator tank including vent means for removing air from the refrigerant, outlet means connected to said air separator tank for draining the refrigerant into a storage reservoir, and compressor means for circulating the refrigerant through said means for vaporizing and said air separator tank into a storage reservoir, said separator means positioned between said compressor means and said means for vaporizing wherein oil from said compressor is removed from said refrigerant, float means positioned in said air separator tank for opening said outlet means when said air separator fills past a predetermined level, said float means including a first buoyant float suspended from a rod and said air separator from said conduit, said first float connected to an outlet valve means positioned along said outlet means wherein said outlet valve means is opened upon refrigerant level in said air separator tank reaching a predetermined level, and a second buoyant float suspended on said rod spaced from said first float, means connecting said second float to said inlet means to shut off said machine upon the second float reaching a predetermined level.

2. The machine of claim 1 wherein said second separator means includes a purge conduit connected to a pressure gauge, said pressure gauge constituting means for reading non-condensable air pressure in said air separator, and purge valve means positioned along said purge conduit for venting air from said air separator to the atmosphere.

3. The machine of claim 1 wherein said storage reservoir is connected in flow communication with said means for vaporizing wherein refrigerant in said storage reservoir may be recirculated back into the machine, and automatic valve means for controlling recirculation flow of refrigerant.

4. The machine of claim 1 and float means housed in said storage reservoir, said float means connected to said outlet means, said float means including valve means for cutting off refrigerant flow into said storage reservoir when refrigerant level therein reaches a predetermined amount.

5. A purification and recovery machine for refrigerants comprising a closed system including inlet means for connecting the machine to a refrigerant source, heat exchanger means connected in flow communication to said inlet means for vaporizing said refrigerant and removing oil therefrom, compressor means connected in flow communication to said heat exchanger means for circulating said refrigerant from said compressor means back into said heat exchanger means, a storage tank, an air separator tank, second conduit means for carrying said refrigerant from said heat exchanger means to said air separator tank connected in flow communication with said second conduit means between said heat exchanger and said storage tank, said air separator tank including vent means for removing air from said refrigerant, said storage means connected in flow communication with said air separator tank, and third conduit means connected between said storage tank and said heat exchanger means for selectively venting refrigerant from the storage tank back into said heat exchanger means to define said closed system.

6. The machine of claim 5 and float means housed in said storage tank, said float means including valve means for cutting flow of refrigerant into said storage tank to prevent overfill.

* * * * *